United States Patent
Knapp

[19]

[11] Patent Number: 6,135,152
[45] Date of Patent: Oct. 24, 2000

[54] PAIR OF HARD MATERIAL PLATES FOR A SEQUENTIAL MIXING VALVE

[76] Inventor: Alfons Knapp, Klockstrasse 15, D-7950 Biberach/Riss, Germany

[21] Appl. No.: 09/236,904

[22] Filed: Jan. 26, 1999

[30] Foreign Application Priority Data

Jan. 28, 1998 [IT] Italy ................................. TO96A0071

[51] Int. Cl.[7] ................................................. F16K 11/074
[52] U.S. Cl. ................................. 137/625.41; 137/625.46
[58] Field of Search ........................... 137/625.41, 625.46

[56] References Cited

U.S. PATENT DOCUMENTS 3,916,951  11/1975  Schmitt ............................... 137/625.41

FOREIGN PATENT DOCUMENTS

| 0 063 627 | 11/1982 | European Pat. Off. . |
| 0 304 529 | 3/1989 | European Pat. Off. . |
| 629821 | 11/1927 | France . |
| 2217610 | 9/1974 | France . |
| 722831 | 11/1966 | Italy . |
| 1 117 783 | 6/1968 | United Kingdom ............... 137/625.41 |
| 2 073 373 | 10/1981 | United Kingdom ............... 137/625.41 |

Primary Examiner—John Fox
Attorney, Agent, or Firm—Young & Thompson

[57] ABSTRACT

A pair of hard material plates form the control members for a sequential type mixing valve, the plates perform, during the control stroke, only a relative rotation around a rotation center, the fixed plate has two passage openings and the movable plate has at least one passage opening, the whole of a first portion of the fixed plate is located on one side of a first straight line passing through the rotation center is lacking in openings, both openings of the fixed plate occupy in their whole just less of a second portion of the fixed plate, lying with respect to the first straight line opposite the first portion of the fixed plate, both openings of the fixed plate are mutually separated by a rib having, at least in part, the minimum width needed for ensuring the seal, the whole of a first portion of the movable plate which is located on one side of a second straight line passing through the rotation center is lacking in openings, and the passage openings of the movable plate occupy in their whole only a part of a second portion of the movable plate, lying with respect to the second straight line opposite the first portion of the movable plate.

19 Claims, 4 Drawing Sheets

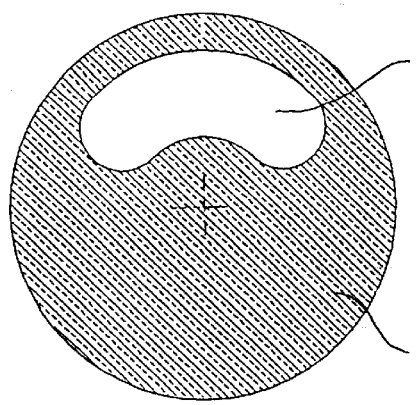
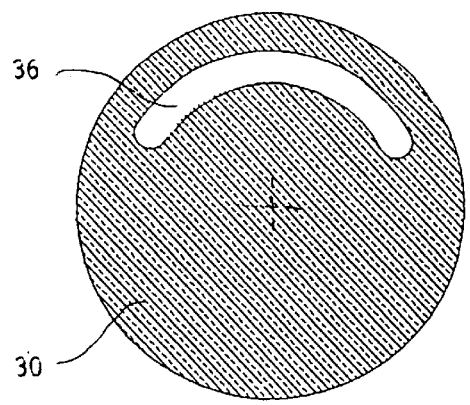
FIG. 10            FIG. 11
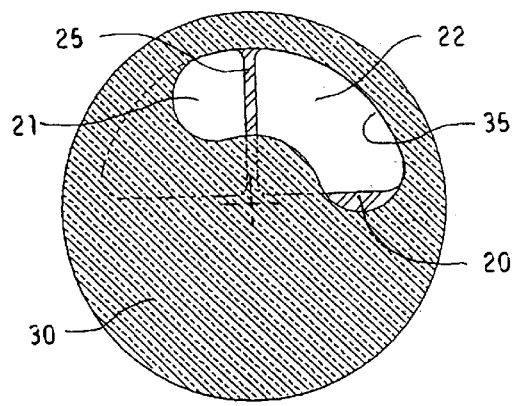
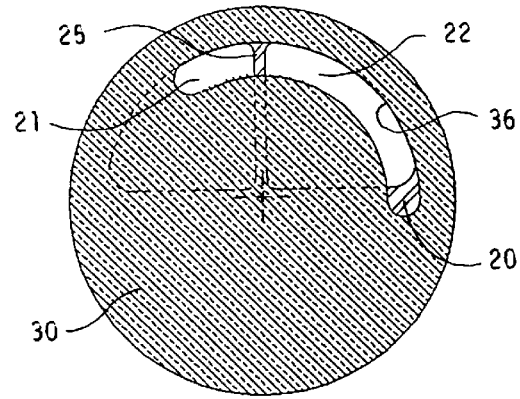
FIG. 12            FIG. 13
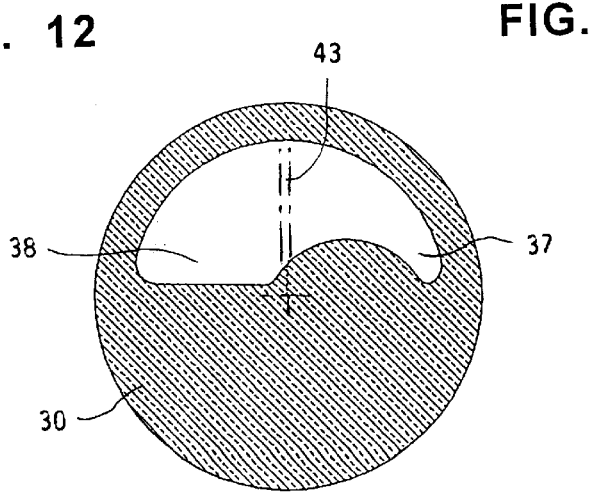
FIG. 14

PAIR OF HARD MATERIAL PLATES FOR A SEQUENTIAL MIXING VALVE

BACKGROUND OF THE INVENTION

1. Field of the Invention

The present invention refers to a pair of hard material plates intended to form the control members for a mixing valve of the so-called sequential type.

2. Description of the Prior Art

The so-called "sequential" mixing valves are those in which a single control member is movable with a sole degree of freedom and, during a complete control stroke starting from a rest position in which the delivery may possibly be shut off, during a first stage allow delivering only cold water, whose delivery rate increases up to a pre-established maximum, then during a second stage (stage of mixing) they effect the mixing of hot water in an increasing ratio with respect to the cold water, up to delivering only hot water, and finally in a third stage they reduce the delivery rate of the hot water, in theory up to attaining again a shut off condition, which however, in the practice, in most cases is hindered for reasons of safety, in order that then the valve could not be inadvertently opened in a condition of delivery of hot water only, which could be dangerous for the user.

In many known embodiments, the extension of the mixing field allowed by the valve is very limited, mainly in those cases in which the delivery takes place through a means opposing a noticeable resistance to the water flow, such as a shower.

In the known embodiments, the mixing stage is done in general by gradually increasing the passage section offered to the hot water and at the same time reducing the passage section offered to the cold water. By this provision it is aimed to maintain substantially constant the delivery rate of the mixed water, but the law of change of the temperature of the delivered water thus obtained is not very satisfactory.

In a mixing device already developed by the same Inventor (Italian Patent No. 722,831), which however refers to a non-sequential valve, a mixing process has been proposed in which the mixing stage is divided in two portions: during the first portion of the mixing stage the passage section offered to the cold water remains constant whilst the passage section offered to the hot water increases, whereas during the second portion of the mixing stage the passage section offered to the hot water remains constant whilst the passage section offered to the cold water decreases. As a result, a certain change in the delivery rate of the mixed water takes place, but the law of change of the temperature of the delivered water thus obtained is more satisfactory. However this known device uses a shutter in the shape of a tap member movable with two degrees of freedom, which could not be employed in a sequential mixer valve nor in a valve using hard material plates.

Moreover, in the known embodiments of sequential mixing valves using hard material plates, the one plate being fixed and the other movable, at least the movable plate has elongated passage openings which cooperate with corresponding passage openings of the fixed plate. These shapings of the passage openings require a relatively large diameter of the plates in order to allow a sufficient delivery rate, and therefore give rise to valves, or cartridges for valves, whose encumbrance is relatively large. In addition, there is an extensive contact surface between the fixed and the movable plates, and therefrom a relatively high friction ensues, and a resulting difficulty in the maneuver of the valve. Finally, the manufacture of the plates is rendered costly by the fact that different molds are required for manufacturing the fixed and the movable plates, which need to be different from each other.

The cited disadvantages have different importance in different applications, whereby pair of plates are manufactured in which both plates have very different shapes, which are intended to satisfy at least in part to different requirements. A change in the shape of the movable plate usually involves the need of changing the shape of the fixed plate too. This leads to considerable costs for manufacturing a number of plates having different shapes.

SUMMARY OF THE INVENTION

In these circumstances, a first object of the present invention is to provide a pair of hard material plates, intended to form the control members of a sequential mixing valve, in which the fixed plate is suitable for being coupled with movable plates having different shapes, which are intended to satisfy the requirements of different applications. This provision aims to reduce the manufacture costs, in that only the movable plates need to be manufactured in different shapes, whereas the fixed plates may be unified among the different pairs of plates.

Another object of the invention is to provide a pair of hard material plates, intended to form the control members of a sequential mixing valve, which, being equal the diameter of the plates and therefore the encumbrance of the valve or cartridge, allows a delivery rate larger that the usual one, or else, which requires a more reduced encumbrance for allowing the same delivery rate.

A further object of the invention is to provide a pair of hard material plates, intended to form the control members of a sequential mixing valve, in which the contact surface between the fixed and the movable plates is lesser that the usual one, thus reducing the friction in the control of the valve.

Still another object of the invention is to render possible, in a sequential mixing valve using hard material plates, a mixing process in which the mixing stage is divided in two portions, during the first portion of the mixing stage the passage section offered to the cold water remaining constant whilst the passage section offered to the hot water increases, whereas during the second portion of the mixing stage the passage section offered to the hot water remains constant whilst the passage section offered to the cold water decreases, thus obtaining a more satisfactory law of change of the temperature of the delivered water.

A further object of the invention is of rendering possible (remaining equal the whole encumbrance) an increase of the diameter of the water inlet ducts made in the body of a valve or a cartridge, in order to reduce the resistances to the water flow.

Finally, it is an object of the invention to reduce the manufacture costs of the hard material plates.

The main objects of the invention are attained, in a pair of hard material plates, one fixed plate and one movable plate, intended to form the control members for a mixing valve of the so-called sequential type, wherein said plates are intended to perform, during the control stroke, only a relative rotation around a rotation center, and wherein the fixed plate has two passage openings and the movable plate has at least one passage opening, in that the whole of a first portion of the fixed plate which is located on one side of a first straight line passing through said rotation center is lacking in openings, that both openings of the fixed plate occupy in their whole just less of a second portion of the fixed plate, lying with respect to said first straight line opposite said first portion of the fixed plate, that both said openings of the fixed plate are mutually separated by a rib having, at least in part, the minimum width needed for ensuring the seal, that a whole portion of the movable plate which is located on one side of a second straight line passing through said rotation center is lacking in openings, and that the passage openings of the movable plate occupy in their whole only a part of a second portion of the movable plate, lying with respect to said second straight line opposite said first portion of the movable plate.

Preferably, at least in the fixed plate, each said passage opening has a shape near a circle sector having its own center in said center of relative rotation of the plates. Preferably, moreover, said circle sector has an angular extension near 90°. Due to such shapings it becomes possible to give to the water inlet ducts an increased diameter or special arrangements.

Preferably, at least the fixed plate is symmetrical with respect to a plane passing through said rib.

In a pair of plates as above defined, another object of the invention is attained in that both plates forming the pair have two passage openings, and that they are substantially identical to each other. In such case, preferably both plates of the pair are identical at all and, therefore, they may be manufactured from the same mold.

When, on the contrary, the two plates forming the pair are not substantially equal to each other, preferably the movable plate has (from the hydraulic point of view) a single passage opening of an arcuate shape. Preferably said passage opening has an asymmetrical shape, having near one of its ends a width very larger than the width it has near the opposite end.

Said opening, which is single from the hydraulic point of view, may be materially subdivided in two or more parts, in order to ensure more strength to the plate.

Thanks to the said features, whilst the shape of the fixed plate remains constant, the movable plate may receive any one of the cited shapings, and others, in order to render the pair of plates (and therefore a valve or a cartridge using the same) fit in the best manner to the features required for each application.

In those cases in which the fixed and movable plate are substantially identical to each other, in the condition in which the passage openings of both plates of the pair are perfectly in register, these openings are completely free for the water passage and, therefore, if they have such a shape that they occupy the most possible part of a half of each plate, by keeping in account the need for seal, the maximum possible passage section is attained, which is compatible with a certain diameter of the plates. As a consequence it is attained the more favourable ratio between the maximum allowed delivery rate and the encumbrance of the valve or cartridge in which the plates according to the invention are mounted. Therefore, the contact surface between both plates is also reduced to a minimum, thus reducing the friction. Moreover, during the mixing stage, the so shaped plates realize the favourable law of change of temperature of the delivered water, as proposed by the Italian Patent No. 722,831, though having the possibility of providing (if required) at least one condition of shut off, and though having a single degree of freedom of displacement, whereby they are suitable for use in a sequential mixing valve. If, finally, both plates are identical at all, their manufacture costs are noticeably reduced, not only by the reduction in the size of plates suitable for ensuring a certain flow rate, but also by the provision of a single mold for manufacturing both the fixed and the movable plates of a pair of plates.

When, on the contrary, particularly when it is foreseen a resistance opposed to the delivery of the water flow, for example by a shower, it is not suitable that the movable plate shows the maximum passage section, thus giving rise to a reduced control sensitivity, a suitably sized arcuate shaping of the passage opening of the movable plate allows obtaining the more favourable compromise between the maximum allowed delivery rate and the control sensitivity. More particularly, by an asymmetrical shaping of the arcuate opening it is possible to attain such a compromise in which the control sensitivity is near the maximum allowable though the maximum delivery rate being near the maximum allowable too.

In addition, due to the application of the invention, the shaping of the openings of the fixed plate is very well adapted to directly receive the supply of hot and cold water from respective ducts, which usually have circular cross section and are made in the body of the valve or cartridge, and this without need for some regions being shaped in complicated manner in order to allow effecting the connections.

Some fixed plates, but intended for a non-sequential mixing valve, showing passage openings which, singularly considered, may appear somewhat similar to the above defined ones, are disclosed in the Italian Patent No. 1,191, 205 of the same Inventor. However, the plates according to said Patent could not be used in a sequential mixing valve because their openings cover, in their whole, all the surface of the fixed plate and, therefore, they should necessarily co-operate with movable plates displaceable according to two degrees of freedom. Moreover, that movable plates could in no way be equal to the fixed plates, and in such conditions the openings of the fixed plates could never be completely discovered by the respective movable plates.

BRIEF DESCRIPTION OF THE DRAWINGS

These and other features, objects and advantages of the subject of the present invention will appear more clearly from the following description of some embodiments, having the character of non-limitative examples, with reference to the accompanying drawings, wherein:

FIG. 5 shows the two superimposed plates in a condition of shut off;

FIG. 6 shows the two superimposed plates in a condition of partial delivery of cold water only;

FIG. 7 shows the two superimposed plates in a condition of the stage of mixing cold and hot water;

FIG. 8 shows the two superimposed plates in a condition of delivery of the maximum flow rate of hot water only;

FIG. 9 shows the two superimposed plates in a condition of reduction of the delivery rate of hot water only;

FIGS. 10 and 11 show two different embodiments of movable plates suitable for co-operating with the fixed plate according to FIG. 2, but having passage openings shaped as arcuate slits of constant width, according to different proportions with respect to the length;

FIGS. 12 and 13 show the movable plates according to FIGS. 10 and 11, superimposed to the fixed plate according to FIG. 2. in an intermediate condition of mixing;

FIG. 14 shows an embodiment of a movable plate suitable for co-operating with the fixed plate according to FIG. 2, but having a passage slit shaped as an arcuate slit of varying width;

DESCRIPTION OF THE PREFERRED EMBODIMENTS

Figure 1:
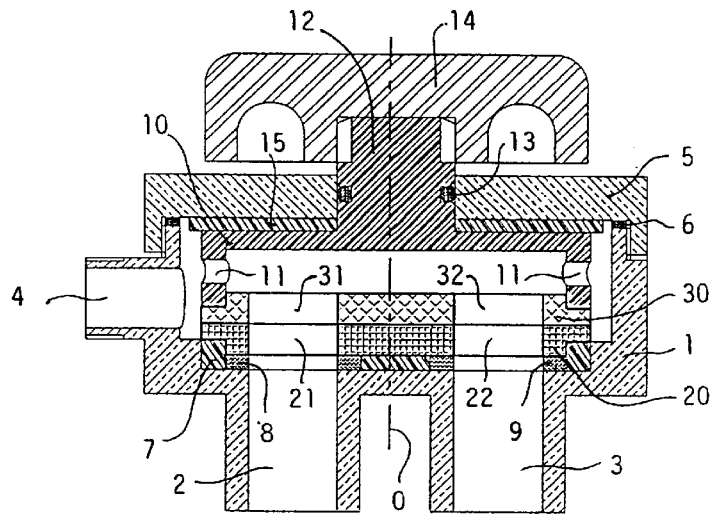
FIG. 1 shows in a diagrammatic manner, in an axial section, a sequential mixing valve of a type in which a pair of hard material plates according to the invention may be used.

With reference to FIG. 1, a sequential mixing valve of the considered type, wherein a pair of plates according to the invention may find application, is diagrammatically shown in an axial section taken along two half planes passing through the connections for water inlet. The valve includes a body 1 provided with two water inlet connections, for example 2 for cold water and 3 for hot water, and with a connection 4 for the delivery of mixed water. Body 1 is closed by a cover 5, sealing by means of a packing 6. In the body 1 is housed a support 7 for a hard material fixed plate 20 provided with passage openings 21 and 22. The support 7 houses two packings 8 and 9, intended for sealing between the connections 2 and 3 for water inlet and the passage openings 21 and 22 of the fixed plate 20. On the fixed plate 20 is mounted, with sealing contact thanks to the precise working of both parts, a hard material removable plate 30, provided with two passage openings 31 and 32 and connected to a bell-shaped support 10 having peripheral bores 11 (only two of which are shown) for the exit of the mixed water. The bell-shaped support 10 is provided with an axial trunnion 12 which may rotate, sealing thanks to a packing 13, in a central bore of cover 5, traversed by the trunnion 12, which protrudes outside in order to receive a maneuver handle 14. A disk 15 made of a low friction material is interposed between the bell-shaped support 10 and the cover 5.

By rotating the handle 14, through the trunnion 12 and the bell-shaped support 10 the movable plate 30 may be rotated, around a central axis 0 of the valve, with respect to the fixed plate 20. This way the position of the passage openings 31 and 32 of the movable plate 30 is modified with respect to the position of the passage openings 21 and 22 of the fixed plate 20, and therefore the control of the valve is effected.

Of course, the fixed plate 20 should be hindered rotating within the valve body 1, whereas the movable plate 30 should be made solid in rotation with the bell-shaped support 10. To this aim suitable shapings are provided, usually in the form of co-operating notches and protrusions of the parts. These shapings are per se well known and have no reference to the realization of the invention, and therefore, for the sake of simplifying the drawing, they have not been represented.

The valve of the example is of a type directly assembled into its own body, but those skilled in the art will easily understand that in the same manner may be provided a cartridge intended to be dismountably inserted into a valve body.

Figures 2, 3:
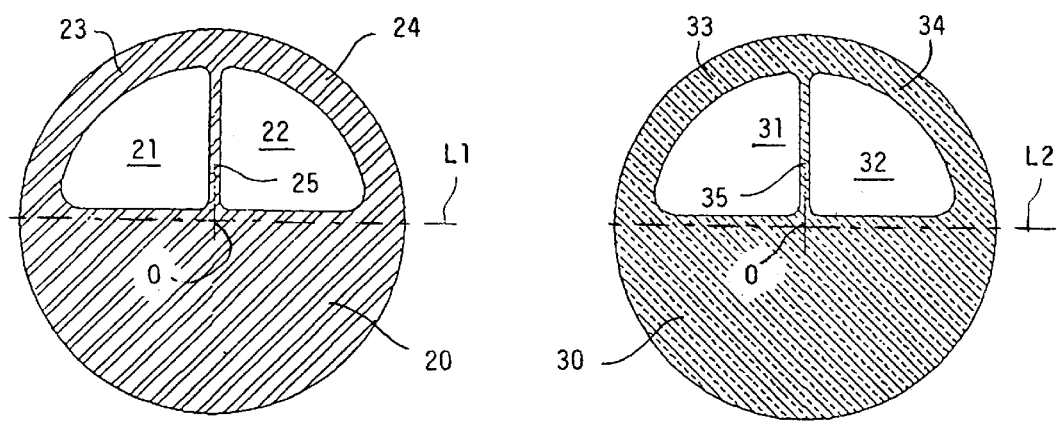
FIGS. 2 and 3 diagrammatically show, respectively, both the hard material plates forming the pair of plates according to a first embodiment of the invention, which are identical to each other but are provided with a different hatching in order to allow distinguishing the same in the following figures.

FIG. 2 diagrammatically shows the shape of the fixed plate being a part of the pair of plates according to the invention, in a preferred embodiment thereof. The fixed plate 20 is shown as having a circular outline whose center is in a point 0, corresponding to the center of relative rotation between the fixed and movable plate, but of course this outline (which does not take any active part to the control operation) may be chosen in any manner for reasons of manufacture. The plate 20 has two passage openings 21 and 22, for example for cold water and for hot water respectively, and as already said these openings, when the plate is mounted within the valve body 1, are put in sealing communication with the inlet connections 2 and 3 for cold and hot water.

It may be observed in FIG. 2 that the whole of a first portion of the fixed plate 20 which is located on one side (namely at bottom according to FIG. 2) of a first straight line L1 passing through said rotation center 0 is lacking in openings, and that both passage openings 21 and 22 of the fixed plate 20 occupy in their whole just less of a second portion of the fixed plate, lying with respect to said first straight line L1 opposite said first portion of the fixed plate, namely lying above line L1 according to FIG. 2.

As it may also be observed in FIG. 2, in the preferred embodiment of the fixed plate 20 each passage opening 21 and 22 is shaped as a circular sector, having its center in the central point 0 of the plate, wherein passes the central axis of the valve when the plate is mounted therein, and having an angular extension of 90°. Both passage openings 21 and 22 are peripherally limited by arcs 23 and 24, and they are mutually separated by a rib 25. The rib 25 is rectilinear, in the shown embodiment it extends along a radius coming from the central point 0, and it has a width, or thickness, which is the minimum suitable for sealing at the contact with the other plate of the pair, on account of the degree of surface machining of the plates and of the foreseen pressure in the use. The straight lines which limits the side of each opening 21 and 22 not limited by the rib 25 are parallel to the line L1 passing through the central point 0, and have therefrom a distance established with the same criterion of suitability for establishing the seal. Therefore, the two openings 21 and 22 occupy in their whole a little less than a half of the available surface of the plate 20.

On the other hand, the peripheral arcs 23 and 24 have a width, or thickness, established with the same criterion of suitability for establishing the seal, and increased as needed for reasons of manufacture and, especially, for mounting and fixing in its position the plate 20. In this preferred embodiment, the plate 20 has a mirror-like symmetry with respect to a diameter passing through the rib 25.

What has been described represents the better application of the invention, but this latter may also be used in a partial or approximate manner, as it will be clarified later on. Moreover, of course, the geometrical definitions given are to be embodied into the fixed plate with the adaptations needed for reasons of manufacture and others. Thus, for example, the angles between the rectilinear sides and the arcs, which define a circle sector, are to be suitably replaced by a curve in view of the requirements of manufacture and resistance of the hard material plate.

As it may be understood from the above description, the passage openings 21 and 22 designed according to the criteria of the invention show the maximum surface which is compatible with the ability of the plate 20 to provide a condition of shut off. Therefore, such a plate is capable to allow the passage of the maximum delivery rate which is compatible with its own diameter of encumbrance.

Figure 4:
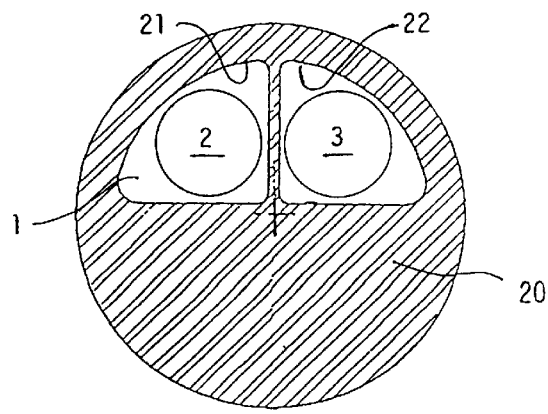
FIG. 4 shows how the fixed plate according to the invention may receive in a rational manner the inlets of the supply waters.

Moreover, as it may be observed in FIG. 4, the passage openings 21 and 22 of the fixed plate 20 are suitable for receiving in the more rational manner the outlets of the supply connections 2 and 3 of the valve body, without the need for any particular shape of these outlets and without covering a portion thereof, as it usually happens with the known shapes of the passage openings of the fixed plate. Thus it is possible to design inlet ducts having a larger diameter (for a done encumbrance of the valve or cartridge), with the purpose of reducing the resistances to the water flow, or even it is possible to arrange said ducts in positions which are suitable for rendering more easy their realization, but which could not be allowed by using fixed plates of known type.

FIG. 3 shows, in a manner similar to FIG. 2, a first embodiment of the movable plate 30 being a part of the pair of plates according to the invention. A feature of this embodiment of the invention is that the movable plate is identical at all to the fixed plate 20, and it has two passage openings 31 and 32 mutually separated by a rib 35, peripherally limited by arcs 33 and 34, and arranged with respect to a line L2 as the passage openings 21 and 22 of the fixed plate 20 are arranged with respect to line L1. In view of the plates 20 and 30 being identical, all what has been described above with reference to the plate 20 applies without any difference to the plate 30, and therefore it is not needed to repeat the description.

It is to be remarked that, as a consequence of the passage openings 21, 22 and 31,32 of both plates 20 and 30 being identical to each other, the superposition of the movable plate 30 onto the fixed plate 20 does in no way limit the passage section offered to the water flows in the condition of maximum delivery, in which the corresponding passage openings of both plates are exactly superimposed. It ensues that the maximum delivery rate allowed by the pair of plates is the maximum theoretically possible considering their diameter. Therefore, the maximum delivery rate allowed may be increased with respect to the known embodiments, being equal the encumbrance size of the valve or cartridge wherein the plates are mounted, or alternatively, the size of the plates and therefore of the valve or cartridge may be reduced, being equal the maximum delivery rate allowed.

The reduction of the size of the hard material plates involves a reduction in their manufacture costs, but this advantage is emphasized by the plates being identical, whereby, according to this embodiment of the invention, a single mold is needed for manufacturing both the fixed and the movable plates.

The embodiment now described and shown includes all the features which may be advantageously applied according to the invention, but it should be understood that the application of the invention may also be only partial. In particular, the operative advantages of the described pair of plates are attained even if the two plates are substantially equal to each other but not identical. In such case, only the advantage of manufacturing both plates from a single mold is lost. On the other hand, the extension of about 90° of the passage openings realizes the maximum possible delivery rate but, in those cases in which such a requirement is not posed, the extension of the passage openings may be lesser than 90°. For special reasons it may be foreseen that the two passage openings of each plate have somewhat different extensions, and in this case one of the passage openings may also have an extension somewhat larger than 90°. The rib separating the two passage openings of a plate need not be exactly rectilinear nor radial; on the contrary, in certain cases it would be preferable that it extends along an inclined direction. Moreover, it is not needed that the width of the rib be constant in all regions. The shape as circle sectors of the passage openings is the more advantageous, but other shapes might be preferred for particular reasons.

It will now be clarified, with reference to FIGS. 5 to 9, how the pair of plates according to the invention, as it has been above described and represented, is capable of providing an advantageous mixing process, derived from that disclosed in the Italian Patent No. 722,831. In said Figures, of course, the position of the fixed plate 20 remains always unchanged, corresponding to its representation in FIG. 2, whereas the movable plate 30 is shown in the different figures displaced with respect to FIG. 3 by different angles of rotation.

Figure 5:
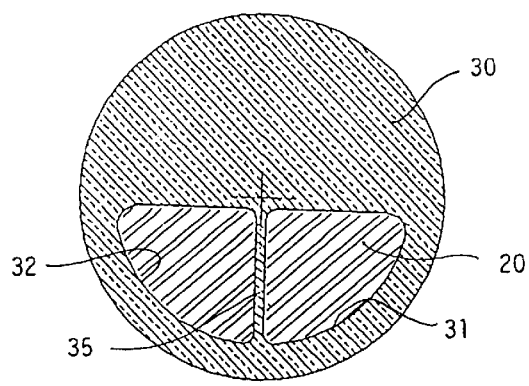
FIGS. 5 to 9 show the two plates according to FIGS. 2 and 3, superimposed in a sequence of operating positions, namely.
Figure 6:
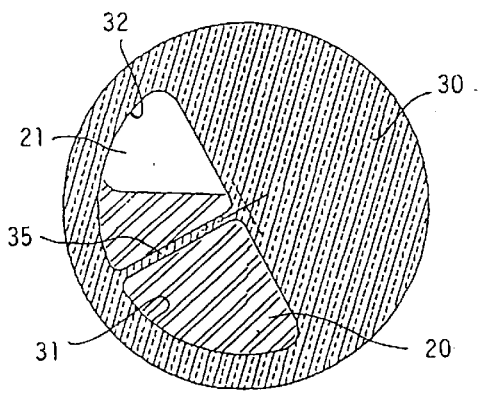

FIG. 5 shows the condition of shut off of the pair of plates. Therefore, the movable plate 30 is rotated by 180° with respect to its representation in FIG. 3. The passage openings of the two plates 20 and 30 do not register mutually, and in view of what has been explicated they are separated by distances sufficient to establish a seal. It is to be remarked, however, that this position of the plates could also not be foreseen, in those cases in which the shut off of the water flow is obtained by different means, and the plates is given only the task of effecting the mixing control.

Figure 7:
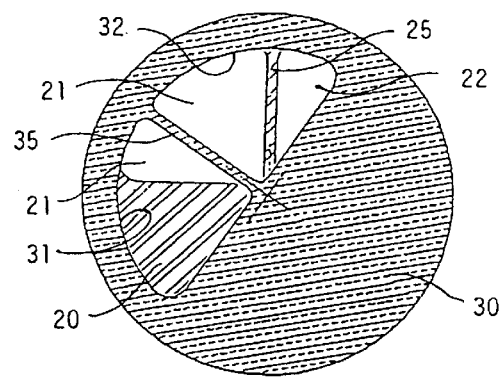
Figure 8:
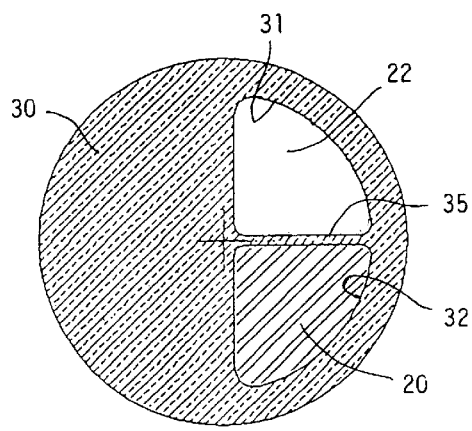
Figure 9:
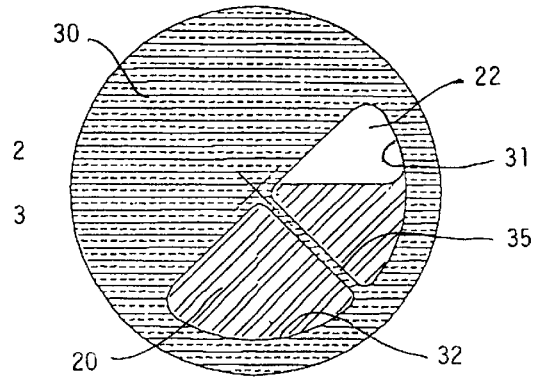

By rotating clockwise by a certain angle the plate 30, its passage opening discovers a portion of the passage opening 21 of the fixed plate 20 (FIG. 6), whereby a limited flow rate of cold water only is delivered. As the rotation proceeds, the passage opening 32 of the movable plate 30 entirely discovers the passage opening 21 of the fixed plate 21, thus giving rise to the delivery of the maximum flow rate of cold water only. Thereafter the rib 35 displaces along the passage opening 21 of the fixed plate 20, which however remains substantially free through portions of both passage openings 31 and 32, whereas the passage opening 32 gradually discovers in increasing manner the passage opening 22 of the fixed plate 20 (FIG. 7). Therefore, the delivery of cold water continues, but to it is added an increasing fraction of hot water. This is the first portion of the mixing stage, and it is concluded when both passage openings 21 and 22 of the fixed plate 20 are discovered.

As the rotation of the movable plate 30 further proceeds, the rib 35 displaces along the passage opening 22 of the fixed plate 20, which however remains substantially free through portions of both passage openings 31 and 32, whereas the passage opening 21 is being gradually covered. This is the second portion of the mixing stage, and it is concluded when the passage opening 21 of the fixed plate 20 has been completely covered, whereas the passage opening 22 is completely discovered (FIG. 8), thus giving rise to the delivery of the maximum flow rate of hot water only.

With a further rotation of the movable plate 30, the passage opening 21 remains closed, whereas the passage opening 22 is being gradually covered in part (FIG. 9), whereby the delivery of hot water only is reduced. Finally, a further rotation of the movable plate 30 (in case it is allowed) completely closes the passage opening 22 of the fixed plate 20, thus reverting to a shut off condition equivalent to that according to FIG. 5.

Of course, by rotating in the opposite direction the movable plate the same conditions described are realized in the opposite sequence. Also the conditions are inverted if the connection of the passage openings 21 and 22 of the fixed plate 20 with the inlets of cold and hot water are inverted.

Therefore, it is clear that the pair of plates according to the first embodiment of the invention provides a mixing process corresponding to that proposed by the Italian Patent No. 722,831, except the possible addition of one or two conditions of shut off. The pair of plates according to the first embodiment of the invention attains therefore the stated advantages, which are characteristic of the mixing process according to said Patent, though rendering the same suitable for the use in a sequential mixing valve using hard material plates.

In the known sequential mixing valves, when the delivery rate changes there is some change in the temperature too. With the pair of plates of the invention, this phenomenon is very reduced due to the substantially equal resistance opposed to both the cold and hot water flows.

In the foregoing is described the entire control field theoretically possible, but when this is preferred the control field allowed to the user may be limited by providing, by means of stops, corresponding limitations to the freedom of movement of the movable plate. In particular, it may be foreseen than in many cases it is to be provided a stop intended to prevent attaining a shut off condition after the delivery of hot water only, whereby then it will not be possible to open the valve with an initial delivery of hot water only, which would represents a danger.

As already said, if the connections of the passage openings of the fixed plate to the inlets for cold and hot water are inverted, the operation of the valve is inverted too. Therefore, when it is foreseen that the valve is to be controlled by an inverted rotation, it may be connected to inverted inlet ducts. In particular, this allows using the same valve in two opposite installations of a so-called "back-to-back" system, wherein two valves are installed on the opposite sides of a wall wherein the supply ducts are immured. In such case, of course, the stops aiming to prevent the opening with delivery of hot water only are to be displaced.

It will be remarked that the presence of the rib 35 separating the passage openings 31 and 32 of the movable plate 30 has no hydraulic action, whereby it could also be lacking. However its presence is to be recommended in order to increase the strength of the movable plate and, when this is required, in order to render the movable plate identical to the fixed plate.

As already said, in the shown embodiment very ample water passages are obtained, and this is of great advantage in many cases. However, when it is foreseen that the delivery takes place through a device opposing a noticeable resistance to the water flow, such as a shower, the ample passages offered by the plates are of no use, because the delivery rate is reduced in any event by the delivery device, and on the contrary the control sensitivity is considerably reduced. In these cases it is therefore suitable the use of movable plates having passage openings shaped in a different manner.

The movable plate 30 according to FIG. 10 has a passage opening 35 of arcuate shape, relatively short and wide, whereas the movable plate 30 according to FIG. 11 has a passage opening 36 of arcuate shape, relatively long and narrow. These movable plates may co-operate with the same fixed plate 20 according to FIG. 2, as shown respectively by the FIGS. 12 and 13, which show the corresponding pair of plates in an intermediate condition of mixing. It is clear that such movable plates do not allow delivering a so large rate of flow as a movable plate according to FIG. 3, but in the presence of a high resistance to the delivery, which would in any event limit the flow rate, they allow considerably increasing the control sensitivity. Therefore, the proportions of the passage openings of such movable plates will be chosen as a function of the characteristics aimed for particular applications.

Figure 15:
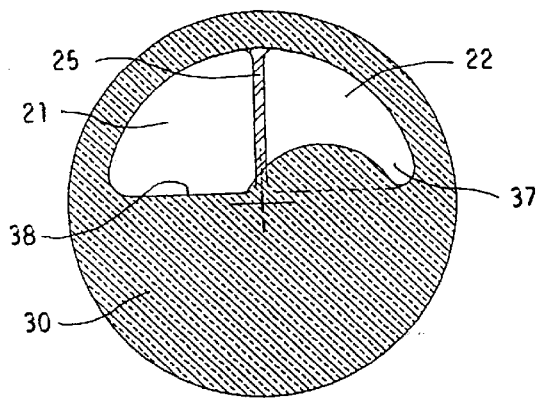
FIGS. 15 and 16 show the movable plate according to FIG. 14, superimposed to the fixed plate according to FIG. 2, in two different conditions of mixing.
Figure 16:
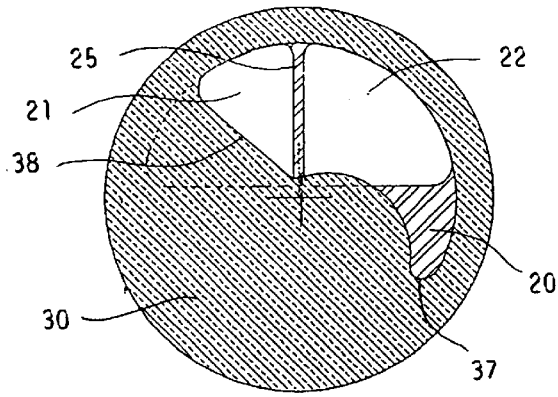
Figure 17:
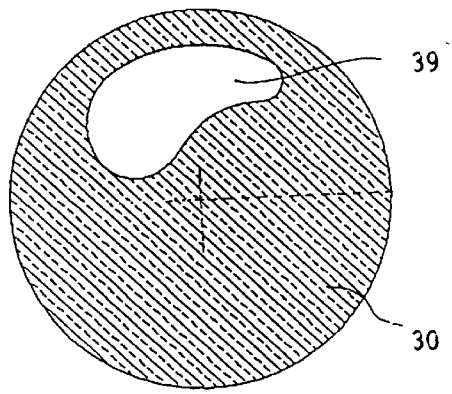
FIGS. 17 to 20 show other different embodiments of movable plates suitable for co-operating with the fixed plate according to FIG. 2, but having a passage opening shaped as an arcuate slit with different designs.
Figure 18:
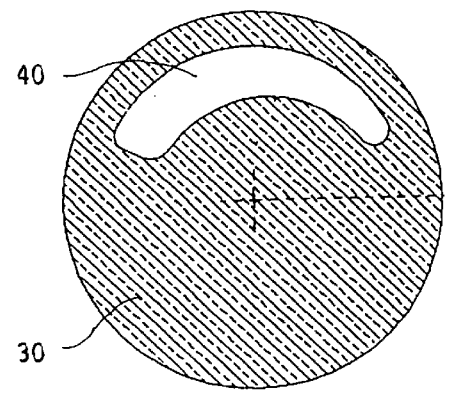
Figure 19:
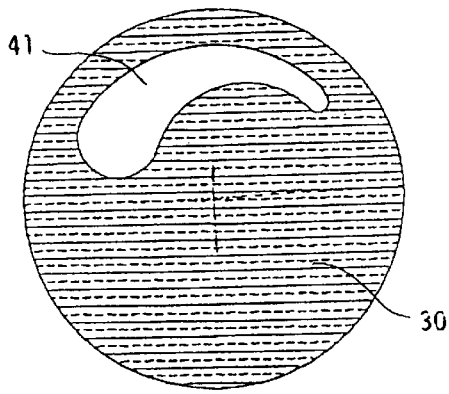
Figure 20:
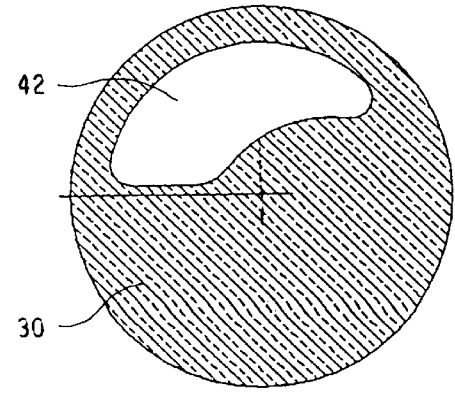

However, a more favourable compromise between the delivered rate and the control sensitivity may be obtained by shaping the passage opening 37–38 of the movable plate 30 as an arcuate slit having a width which varies from a minimum at the end 37 to a maximum at the end 38, as shown by FIG. 14. This plate is shown superimposed to a fixed plate 20 in FIGS. 15 and 16, in two different mixing conditions. As it may be observed, when the mixing control movement proceeds, the end portion 37 having a lesser width controls the mixing ratio with a high sensitivity, whereas in the conditions of delivery of a large flow rate the end portion 38 having a larger width allows delivering a flow rate near the maximum possible delivery rate.

Also in this case it is possible to conform the behaviour of the pair of plates to the requirements of specific applications, through a suitable shaping and proportioning of the passage opening of the movable plate 30. This is evidenced by the examples in FIGS. 17 to 20, which show movable plates having differently shaped passage openings 39, 40, 41 or 42.

Some movable plates having passage openings similar to those now described are per se known, but they have always been used in co-operation with fixed plates having passage openings similar to that of the movable plate, and not in co-operation with a fixed plate as that proposed by the present invention.

In all the embodiments described with reference to FIGS. 10 to 20 it has been supposed that the passage opening of the movable plate is single, but it should be understood that each passage opening might be subdivided in two or more portions by ribs (such as the rib 43 in FIG. 14), which have no hydraulic effect but give the plate more strength.

It is to be stated that the invention is not limited to the embodiments described and shown. Many possible changes have been described, and others will be evident to those skilled in the art. Moreover, it is clear that the invention extends to any single plate having peculiarities suitable for render the same apt to form a pair of plates as defined by the invention, when it is coupled with another suitable plate.

The stated changes and others, as well as any replacement with technically equivalent means, may be made to what has been described and shown, within the scope of the appended claims:

What is claimed is:

1. Control members of a sequential type mixing valve or valve cartridge comprising:
   a pair of hard material plates for insertion into the sequential type mixing valve or valve cartridge,
   a first of said pair of plates being a fixed plate and a second of said pair of plates being a movable plate contacting said fixed plate and rotatable around a rotation center,
   said pair of plates arranged to perform, during a control stroke, only a relative rotation around the rotation center, the fixed plate being subdivided by a first straight line passing through the rotation center into a first portion free of any openings and a second portion, the second portion of said fixed plate being opposite the first portion and having two passage openings separated by a rib with a width for sealing at a contact with said movable plate, an area of the two passage openings being just less than an area of the first portion of said fixed plate, said movable plate being subdivided by a second straight line passing through the rotation center into a first portion free of any openings and a second portion, the second portion of said movable plate being opposite the first portion and having at least one passage opening, the at least one passage opening in its whole occupying only a part of the second portion of the movable plate.

2. The control members of claim 1, wherein each of the two passage openings of the fixed plate comprise a circular sector shape having a center in the center of the relative rotation of the pair of plates.

3. The control members of claim 2, wherein the circular sector comprises an angular extension of approximately 90°.

4. The control members of claim 1, wherein at least the fixed plate is symmetrical with respect to a plane passing through said rib.

5. The control members of claim 1, wherein each of the fixed and movable plate comprise two passage openings, the two passage openings in the fixed plate being of approximately equal size to the two passage openings of the movable plate.

6. The control members of claim 5, wherein the fixed plate is identical to the movable plate.

7. The control members of claim 1, wherein the fixed plate and the movable plate are non-identical, and the movable plate has only a single passage opening in the shape of an arcuate slit.

8. The control members of claim 7, wherein the movable plate single passage opening has a asymmetrical shape, one end of the asymmetrical shape being larger in width than an opposite end of the asymmetrical shape.

9. The control members of claim 1, wherein the movable plate comprises two or more passage openings.

10. The control members of claim 1, wherein the fixed plate and movable plate are alignable to create, in the passage sections, a two-portion mixing stage, a first portion of the two-portion mixing stage being a constant cold water section and an increasing hot water section, and a second portion of the two-portion mixing stage being a constant hot water section and an decreasing cold water section.

11. The control members of claim 10, wherein said second portion of the two-portion mixing stage further comprises a shut-off position at an end of a control field.

12. A sequential-type mixing valve or valve cartridge comprising:

a valve body housing a fixed plate support;

a pair of hard material plates for insertion into the valve body;

a first of said pair of plates being a fixed plate mounted on the fixed plate support and a second of said pair of plates being a movable plate contacting said fixed plate and rotatable around a rotation center, said pair of plates arranged to perform, during a control stroke, only a relative rotation around the rotation center, the fixed plate being subdivided by a first straight line passing through the rotation center into a first portion free of any openings and a second portion, the second portion of said fixed plate being opposite the first portion and having two passage openings separated by a rib with a width for sealing at a contact with said movable plate, an area of the two passage openings being just less than an area of the first portion of said fixed plate, said movable plate being subdivided by a second straight line passing through the rotation center into a first portion free of any openings and a second portion, the second portion of said movable plate being opposite the first portion and having at least one passage opening, the at least one passage opening in its whole occupying only a part of the second portion of the movable plate.

13. The valve of claim 12, wherein each of the two passage openings of the fixed plate comprise a circular sector shape having a center in the center of the relative rotation of the pair of plates.

14. The valve of claim 13, wherein the circular sector comprises an angular extension of approximately 90°.

15. The valve of claim 12, wherein at least the fixed plate is symmetrical with respect to a plane passing through said rib.

16. The valve of claim 12, wherein each of the fixed and movable plate comprise two passage openings, the two passage openings in the fixed plate being of approximately equal size to the two passage openings of the movable plate.

17. The valve of claim 16, wherein the fixed plate is identical to the movable plate.

18. The valve of claim 12, wherein the movable plate comprises two or more passage openings and is non-identical to the fixed plate.

19. The valve of claim 12, further comprising:

a means for aligning the fixed plate and movable plate for creating, in the passage sections, a two-portion mixing stage, a first portion of the two-portion mixing stage being a constant cold water section and an increasing hot water section, and a second portion of the two-portion mixing stage being a constant hot water section and an decreasing cold water section, wherein said second portion of the two-portion mixing stage further comprises a shut-off position at an end of a control field.

* * * * *